Sept. 19, 1939.  F. E. RUNGE  2,173,237
MOVING PICTURE APPARATUS
Filed Aug. 31, 1937
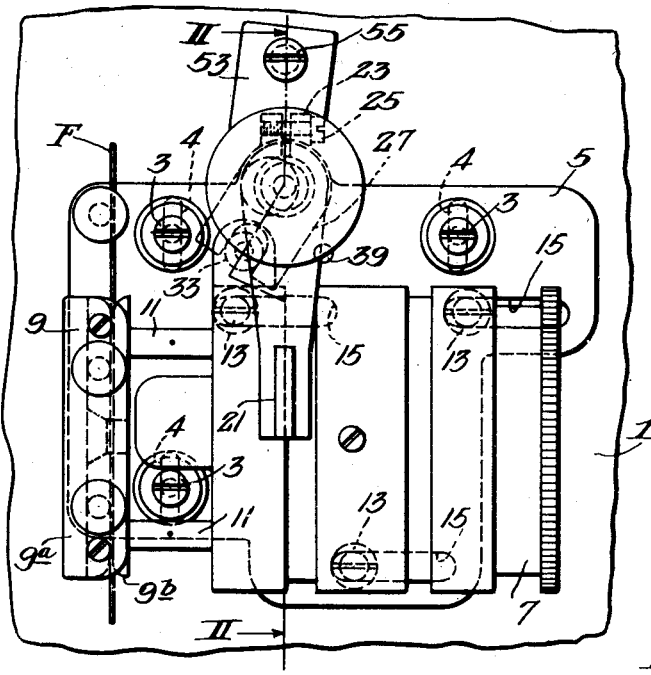
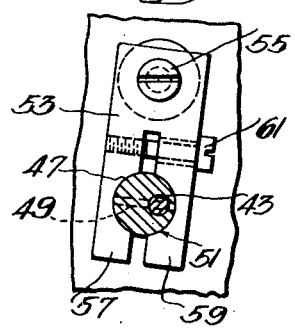
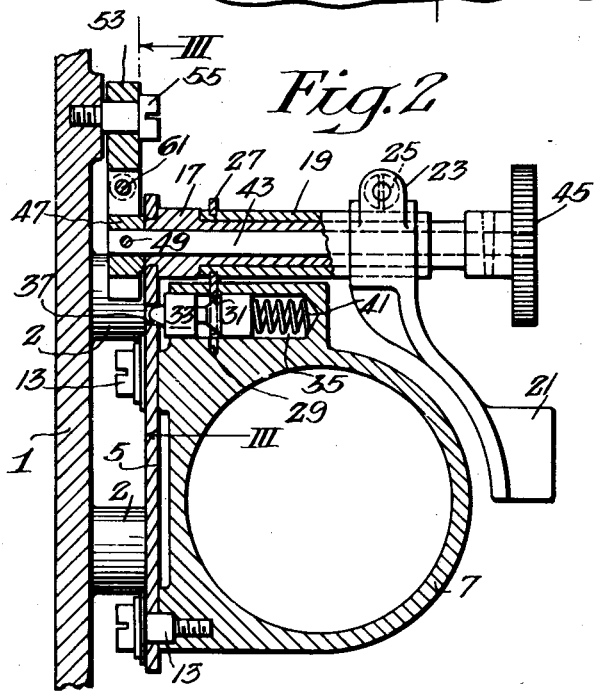
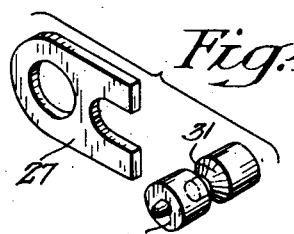
Inventor
Frank E. Runge
By
Attorney Patented Sept. 19, 1939

2,173,237

UNITED STATES PATENT OFFICE 2,173,237

MOVING PICTURE APPARATUS

Frank E. Runge, Oaklyn, N. J., assignor to Radio Corporation of America, a corporation of Delaware Application August 31, 1937, Serial No. 161,812

10 Claims. (Cl. 88—17)

This invention relates to moving picture apparatus, and more particularly to the framing mechanism thereof and to the mechanism for latching the film gate in either closed or open position, the primary object of my invention being to provide, in a moving picture projector, simplified mechanism for quickly and easily framing the projected picture upon the screen as well as easily operable mechanism for latching and unlatching the film gate in either of its extreme positions.

Another object of my invention is to provide improved framing mechanism for a moving picture projector which will permit always maintaining the film gate apertures in axial alignment with the projection lens system.

Still another object of my invention is to provide improved framing mechanism as aforesaid which is positive in action and which will efficiently maintain the film gate in suitable relation to the film regardless of the position of adjustment thereof.

A further object of my invention is to provide improved mechanism, in a moving picture projector, for easily opening the film gate to permit facile threading of the film and which will be positively latched against unintentional movement when either in closed or open position.

In accordance with my invention, I mount the film gate and the projection lens system upon a plate which is slidable in the direction normal to the light path whereby the entire assembly is movable bodily as a unit relative to the light path. This permits easily framing the picture while always maintaining the axis of the optical system and that of the picture apertures in the film gate in alignment. Movement of the unit is effected by an eccentric disc carried by a framing shaft on said unit, the disc being received within a suitable opening in a friction pad which retains the unit in adjusted position. To facilitate threading of the film, the movable plate of the film gate and the projection lens mounting barrel are coupled together for sliding movement as a unit on said slidable plate in the direction of the light beam, and the latter unit is operated by a manipulating handle preferably concentric with the framing shaft. A spring pressed latching pin having a cam element thereon latches the last named unit in either open or closed position, a cam actuating plate associated with the manipulating handle serving to act against said cam element to automatically unlatch the pin upon manipulation of the handle in either direction. This permits moving the last named unit from one position to the other with one continuous movement.

The novel features that I consider characteristic of my invention are set forth with particularity in the appended claims. The invention itself, however, both as to its organization and method of operation, together with additional objects and advantages thereof, will best be understood from the following description of a specific embodiment thereof, when read in connection with the accompanying drawing, in which Figure 1 is a side elevation of one form of my invention, Figure 2 is a sectional view taken approximately along the line II—II of Fig. 1, Figure 3 is a detailed view, partly in elevation and partly in section, showing the friction pad for holding the assembly in framed position and taken along the line III—III of Fig. 2, and Figure 4 is a detailed perspective view of the latching pin and the cam plate which cooperates with the cam element thereof.

Referring more particularly to the drawing, wherein similar reference characters designate corresponding parts throughout, there is shown a projector having a main supporting plate or frame 1 provided with a plurality of studs 2 each threadedly receiving a screw 3 extending through the slots 4 of a mounting plate 5 slidably mounted on the frame 1 for movement in the direction of movement of a film F. The mounting plate 5 carries a lens mounting barrel 7 for a projection lens (not shown) and a film gate 9. The aperture plate 9ª of the film gate 9 is fixed to the mounting plate 5 while the aperture plate 9ᵇ of the film gate 9 is coupled to the barrel 7 for sliding movement therewith as a unit on the plate 5 in a direction normal to the direction of movement of the plate 5 itself. Preferably, the movable plate 9ᵇ and the lens mounting barrel 7 are coupled together by a pair of spaced members 11 in the manner disclosed in my copending application Serial No. 118,518, filed December 31, 1936, the lens barrel 7 having a plurality of studs 13 screwed therein and received within the slots 15 in the mounting plate 5 to permit sliding movement thereof on the plate 5 together with the movable aperture plate 9ᵇ.

Staked or otherwise suitably secured to the mounting plate 5 is a bearing 17 upon which is rotatably carried a sleeve 19 having a finger piece or manipulating handle 21 secured thereto, as by means of a split collar 23 and a screw 25. The sleeve 19 also has secured thereto a cam plate 27 which extends down into a slot 29 in the barrel 7 and is bifurcated to embrace a frusto-conical cam element 31 on a latching pin 33 within a bore 35 in the barrel 7. The latching pin 33 is adapted to enter an opening 37 in the plate 5 when the aperture plate 9b is in closed position relative to the aperture plate 9a to latch it in this position, and to enter a second opening 39 in the plate 5 spaced from the opening 37 to latch the aperture plate 9b in open position, a spring 41 within the bore 35 constantly urges the pin 33 in a direction to enter one or the other of the openings 37 and 39.

When the film F is to be threaded in the gate 9, the finger piece 21 is moved to the right (as viewed in Fig. 1). The cam plate 27, acting against the cam element 31, first effects withdrawal of the pin 33 from the opening 37 and then moves the movable aperture plate and the barrel 7 as a unit to the open position, in which the pin 33 enters the opening 39 to latch the unit in this position. The film F having been threaded in the gate 9, the finger piece 21 is manipulated in the opposite direction and the cam plate 27, again acting on the cam element 31, first withdraws the pin 33 from the opening 39 and then moves the aforementioned unit back to closed position wherein the pin 33 again enters the slot 37. It will be noted that the movement or manipulation of the finger piece 21 in either direction is a single and continuous one, the cam plate 27 serving to both unlatch the pin 33 and to move the unit in the manner described.

The mounting plate 5, the film gate 9 and the lens mounting barrel 7 together constitute a framing assembly movable as a unit relative to the film F whereby the pictures on the film may be properly framed in the apertures of the plates 9a and 9b. For moving this assembly, the bearing 17 rotatably carries a framing shaft 43 which has an operating knob 45 fixed to one end thereof and a circular disc 47 eccentrically fixed thereon at its other end, as by means of a cross pin 49. The disc 47 is frictionally received within a circular opening 51 in a friction pad 53 which is pivotally carried by a stud 55 threaded into the main frame 1. The friction pad 53 may be made of fiber, hard rubber, or the like, and is preferably bifurcated through the opening 51 to provide the bifurcated portions or arms 57 and 59, a screw 61 passing loosely into the latter arm and being threaded into the arm 57 whereby the arms 57 and 59 may be suitably drawn together after inserting the disc 47 into the opening 51 to adjust the pressure on the disc 47.

To frame a picture, it is merely necessary to grasp the knob 45 and turn the framing shaft 43 in either direction. The disc 47 may, of course, be rotated within the opening 51 through 360°, and since the shaft 43 is eccentric to the disc 47 and the opening 51, it will be obvious that the framing assembly will be moved up or down thereby until the picture is in frame. It will also be noted that the same relation, viz., the axial alignment of the apertures in the plates 9a and 9b with the axis of the projection lens in the barrel 7, is always maintained. The frictional force between the pad 53 and the eccentric disc will maintain the framing assembly in adjusted position.

While I have shown and described but one embodiment of my invention, I am fully aware that many other modifications thereof are possible. Many changes within the sphere of my present invention will, no doubt, readily suggest themselves to those skilled in the art. I therefore desire that my invention shall not be limited except insofar as is made necessary by the prior art and by the spirit of the appended claims.

I claim as my invention:

1. In moving picture apparatus, the combination of an assembly comprising a projection lens and a film gate adapted to receive a moving picture film, a framing shaft carried by said assembly, a cam element comprising a circular disc eccentrically mounted on said framing shaft, and a member mounted for pivotal movement and having a circular opening therein receiving said cam element, the pivotal mounting of said member permitting rotation of said cam element in said opening through 360°, and the rotation of said framing shaft effecting movement of said assembly relative to the film whereby to frame the pictures thereof in said gate.

2. In moving picture apparatus, the combination of an assembly comprising a projection lens and a film gate adapted to receive a moving picture film, a framing shaft carried by said assembly, a cam element comprising a circular disc eccentrically mounted on said framing shaft, and a friction pad having a circular opening therein frictionally receiving said cam element, the cooperation of said cam element and said friction pad upon rotation of said framing shaft effecting movement of said assembly relative to the film whereby to frame the pictures thereof in said gate.

3. The invention set forth in claim 2 characterized in that said friction pad is bifurcated, characterized further in that the bifurcation extends through the opening in said friction pad, and characterized still further by the addition of means on said pad for adjusting the bifurcated portions thereof relative to each other whereby to vary the frictional force applied by said pad to said cam element.

4. The invention set forth in claim 2 characterized in that said friction pad is pivotally mounted and is bifurcated, the bifurcation extending through said friction pad opening, and characterized further by the addition of means on said pad for adjusting the bifurcated portions thereof relative to each other whereby to vary the frictional force applied by said pad to said cam element, the pivotal mounting of said pad permitting rotation of said cam element in said opening through 360° whereby to frame the pictures in said film gate.

5. In moving picture apparatus, the combination of a supporting plate, a second plate slidably mounted thereon, a film gate and a projection lens mounted on said second named plate in predetermined relation to each other and constituting therewith a framing assembly, a bearing carried by said second named plate, a framing shaft rotatably carried in said bearing, a friction pad pivotally mounted on said first named plate, said friction pad having an opening therein, and a cam element fixed to said framing shaft and frictionally received within said opening, said opening and cam element being so related that rotation of said framing shaft will effect movement of said assembly to frame in said film gate the pictures of a film threaded therein without disturbing said predetermined relation between said film gate and said projection lens, and the frictional force between said cam element and said friction pad serving to retain said assembly in adjusted position.

6. The invention set forth in claim 5 characterized by the addition of means for varying the frictional force applied by said pad to said cam member.

7. In moving picture apparatus, the combination of a supporting plate, a second plate slidably mounted thereon, a film gate and a projection lens mounted on said second named plate and constituting therewith a framing assembly, said film gate including a movable aperture plate coupled to said lens for movement therewith as a unit on said second named plate relative to the fixed aperture plate of said film gate, a bearing carried by said second named plate, a framing shaft rotatably carried in said bearing, means associated with said framing shaft for effecting movement of said assembly upon rotation of said framing shaft to frame in said film gate the pictures of a film threaded therein, a latching member associated with said unit for latching said movable aperture plate in either closed or open position, a sleeve rotatably carried by said bearing, and a member fixed to said sleeve and adapted to be manually grasped to move said unit from closed to open position and vice versa.

8. In moving picture apparatus, the combination of a mounting member, a film gate having a pair of cooperating aperture plates one of which is fixed to said mounting member and the other of which is movable thereon relative to said fixed aperture plate, a latching device associated with said movable aperture plate for latching it in either open or closed position, said latching device including a cam element, a bearing on said mounting member, a sleeve rotatably carried by said bearing, a finger piece fixed to said sleeve, and means coupling said sleeve to said latching device for unlatching said latching device to permit movement of said movable aperture plate from closed to open position and vice versa upon manipulation of said finger piece, said coupling means comprising a plate fixed to said sleeve and bifurcated to embrace said cam element whereby, upon manipulation of said finger piece, said plate acts upon said cam element to move said latching device out of latching position.

9. The invention set forth in claim 8 characterized in that said mounting member is provided with a pair of spaced openings, characterized further in that said latching device comprises a pin adapted to enter one of said openings when said movable aperture plate is in closed position and the other of said openings when said movable aperture plate is in open position, and characterized still further by the addition of spring means constantly urging said pin in a direction to enter one or the other of said openings, said plate acting upon said cam element against the action of said spring to first withdraw said pin from the opening with which it is then in engagement and then to move said movable aperture plate toward the other of said openings upon manipulation of said finger piece.

10. In moving picture apparatus, the combination of a mounting member having a pair of spaced openings therein, a film gate having a pair of cooperating aperture plates one of which is fixed to said mounting member and the other of which is movable thereon relative to said fixed aperture plate, a lens mounting barrel movably mounted on said mounting member, said barrel having a bore therein, means coupling said movable aperture plate and said barrel for movement together as a unit, a latching pin within said bore adapted to enter one of said openings when said movable aperture plate is in closed position and the other of said openings when said movable aperture plate is in open position, said latching pin having a cam element thereon, a spring in said bore acting upon said pin to constantly urge it in a direction to enter one or the other of said openings, a bearing carried by said mounting member, a sleeve rotatably mounted on said bearing, a finger piece fixed to said sleeve, and a plate also fixed to said sleeve having a bifurcated portion embracing said cam whereby, upon manipulation of said finger piece, said plate acts upon said cam element against the action of said spring first to withdraw said pin from the opening with which it is then in engagement and then to move said movable aperture plate toward the other of said openings.

FRANK E. RUNGE.